United States Patent
Kenaley et al.

(10) Patent No.: US 10,110,981 B2
(45) Date of Patent: Oct. 23, 2018

(54) VIBRO ACOUSTIC COVER USING EXPANDED PTFE COMPOSITE

(71) Applicant: W. L. Gore & Associates, Inc., Newark, DE (US)

(72) Inventors: Ryan Kenaley, Hockessin, DE (US); Valerie Regina Binetti, Garnet Valley, PA (US); Anit Dutta, Wilmington, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 167 days.

(21) Appl. No.: 15/197,476

(22) Filed: Jun. 29, 2016

(65) Prior Publication Data

US 2017/0006369 A1   Jan. 5, 2017

Related U.S. Application Data

(60) Provisional application No. 62/186,492, filed on Jun. 30, 2015.

(51) Int. Cl.
*H04R 1/08*   (2006.01)
*H04R 1/02*   (2006.01)
(Continued)

(52) U.S. Cl.
CPC .............. *H04R 1/086* (2013.01); *B32B 5/02* (2013.01); *B32B 27/322* (2013.01);
(Continued)

(58) Field of Classification Search
CPC .......... H04R 1/28; H04R 1/023; H04R 1/086; B32B 27/322; G10K 11/002
(Continued)

(56) References Cited

U.S. PATENT DOCUMENTS 5,476,589 A   12/1995   Bacino
5,828,012 A   10/1998   Repolleet et al.
(Continued)

FOREIGN PATENT DOCUMENTS

EP        2 741 522 A1     6/2014
WO    WO-2015/057693 A1    4/2015

OTHER PUBLICATIONS (Edited by) Richard G. Jones, Wataru Ando, and Julian Chojnowski; "Silicon-containing polymers : the science and technology of their synthesis and applications"; Published in 2000; Kluwer Academic Publishers; Chapter 8: "Surface Properties and Applications", Michael J. Owen, pp. 213-214.*

(Continued)

*Primary Examiner* — Jeremy Luks
(74) *Attorney, Agent, or Firm* — Greenberg Traurig, LLP

(57) ABSTRACT

An acoustically reactive composite can include an expanded polytetrafluoroethylene (ePTFE) membrane formed of a highly fibrillated ePTFE microstructure with an elastomer fully impregnated within the ePTFE membrane. The composite can have an acoustic loss of less than 7 dB at 1 kHz and a water entry pressure (WEP) of at least 20 PSI. A layered assembly for protecting an acoustic device can include an acoustically reactive composite as described above and an adhesive layer arranged to define an acoustic cavity. An acoustic device can incorporate an acoustically reactive composite or layered assembly as described above, with the acoustically reactive composite or layered assembly arranged to span an acoustic cavity proximate to a transducer of the acoustic device.

20 Claims, 6 Drawing Sheets

(51) Int. Cl.
    *B32B 27/32*     (2006.01)
    *B32B 5/02*     (2006.01)
    *H04R 1/28*     (2006.01)
    *G10K 11/00*     (2006.01)

(52) U.S. Cl.
    CPC .......... *G10K 11/002* (2013.01); *H04R 1/023* (2013.01); *H04R 1/28* (2013.01); *B32B 2307/10* (2013.01)

(58) Field of Classification Search
    USPC ................................ 181/149, 291
    See application file for complete search history.

(56) References Cited

U.S. PATENT DOCUMENTS

| | | |
|---|---|---|
| 6,512,834 B1 | 1/2003 | Banter et al. |
| 7,306,729 B2 | 12/2007 | Bacino et al. |
| 7,462,672 B2 | 12/2008 | Chang et al. |
| 2002/0031628 A1* | 3/2002 | Zumbrum ............ B32B 5/32 428/36.9 |
| 2005/0077102 A1* | 4/2005 | Banter .................. H04R 1/023 181/149 |
| 2009/0191357 A1* | 7/2009 | Moore ............... B01D 67/0093 427/551 |
| 2011/0255728 A1* | 10/2011 | Abe ....................... H04M 1/03 381/355 |
| 2014/0048351 A1 | 2/2014 | Banter |
| 2014/0083296 A1* | 3/2014 | Sanders ............... G06F 1/1656 96/11 |
| 2014/0283691 A1* | 9/2014 | Furuuchi ............... B01D 71/36 96/12 |
| 2015/0238909 A1* | 8/2015 | Mori ....................... C08J 7/047 96/12 |
| 2016/0301998 A1* | 10/2016 | Abe ....................... H04R 1/086 |

OTHER PUBLICATIONS

International Search Report and Written Opinion for Application No. PCT/US2016/040308, dated Oct. 28, 2016.

* cited by examiner

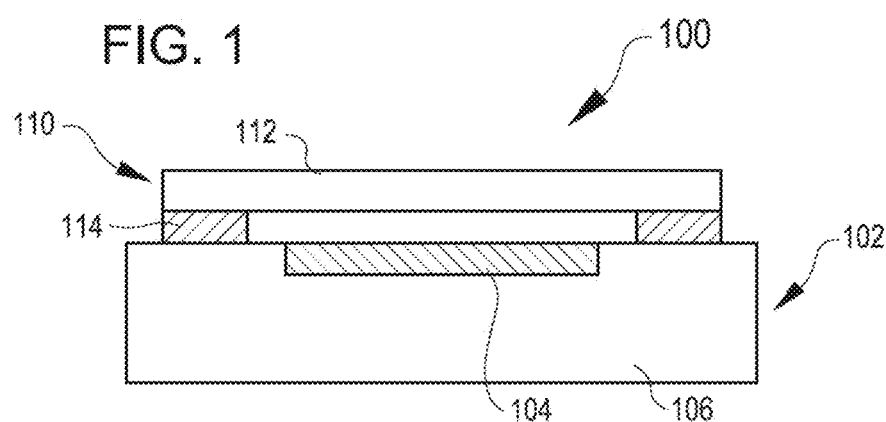

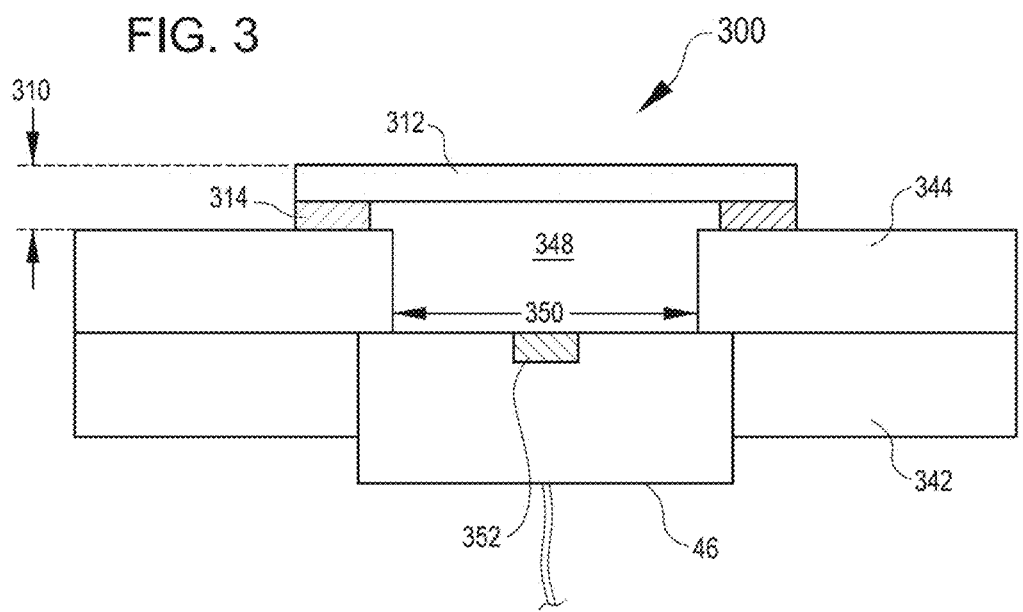

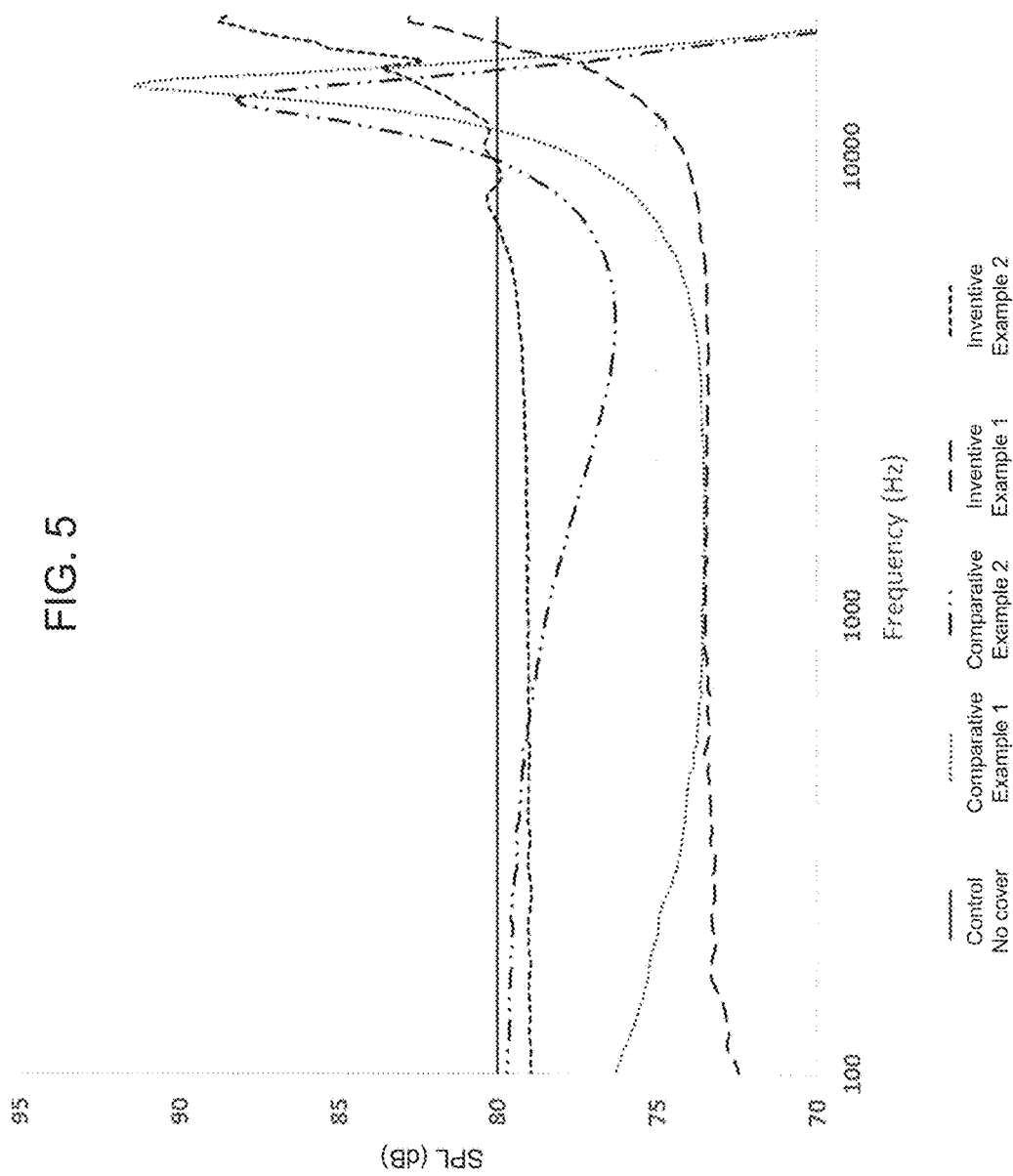

VIBRO ACOUSTIC COVER USING EXPANDED PTFE COMPOSITE

CROSS-REFERENCES TO RELATED APPLICATIONS

This patent application claims priority from U.S. Provisional Application Ser. No. 62/186,492, entitled "Vibro Acoustic Cover Using Expanded PTFE Composite," filed Jun. 30, 2015, the disclosure of which is incorporated herein by reference in its entirety.

FIELD OF INVENTION

This disclosure relates to the field of composite membranes and protective covers including composite membranes.

BACKGROUND

Electronic devices such as cellular phones, pagers, radios, hearing aids, headsets, barcode scanners, digital cameras, etc. are designed with enclosures having small openings located over an acoustic transducer (such as a bell, speaker, microphone, buzzer, loudspeaker, etc.) to allow sound transmission. Protective acoustic covers are placed over openings to protect the transducer from damage from dust and water intrusion.

Known protective acoustic covers include non-porous films and micro-porous membranes, such as expanded PTFE (ePTFE). Protective acoustic covers are also described in U.S. Pat. Nos. 6,512,834 and 5,828,012. Some such covers may be commercially available as Part Numbers: GAW 324, GAW 325 from W.L. Gore & Associates, Inc.

A protective cover can transmit sound in two ways: the first is by allowing sound waves to pass through it, known as a resistive protective cover; the second is by vibrating to create sound waves, known as a vibroacoustic, or reactive, protective cover.

To preserve acoustic performance of transducers, protective acoustic covers must provide minimal sound attenuation while offering high resistance to water intrusion and protection from deep immersion in water or other liquids. Further, it may be desirable to have a protective acoustic cover with enables SWB (Super Wide Band) HD (high definition) Voice call. A vibroacoustic protective cover made using the expanded PTFE composite of the present disclosure satisfies the above needs.

SUMMARY OF THE INVENTION

According to some embodiments, the present disclosure provides an acoustically reactive composite having: an ePTFE membrane having a microstructure of substantially only fibrils; an elastomer fully impregnated within the ePTFE membrane to form the composite; wherein said composite has an acoustic loss of less than 7 dB at 1 KHz; and wherein said composite has a WEP of about 20 PSI or greater. Preferably, the composite has a mass of about 1.5 grams/m$^2$, the ePTFE membrane has a thickness of about 3.2 microns, the ePTFE membrane has a Matrix Tensile Strength of about 655 MPa in the longitudinal direction and about 310 MPa in the transverse direction, the composite has an elastomer weight percent of between about 20% and about 90%, the composite has a first side and a second side and further comprises a layer of elastomer on at least one of the first and second sides, the layer of elastomer is about 2 microns thick, the ePTFE membrane is less than about 25 microns thick, and the composite has a resonance peak of greater than 15 KHz. In other aspects, the disclosure provides a microphone and a speaker having the acoustically reactive composite described herein.

According to some other embodiments, the present disclosure provides a layered assembly including an acoustically reactive composite in conjunction with an adhesive layer, wherein the layered assembly defines an acoustic cavity. The acoustically reactive composite is formed of an ePTFE membrane having a highly fibrillated microstructure and an elastomer fully impregnated within the ePTFE membrane.

According to some other embodiments, the present disclosure provides an acoustic device including an acoustically reactive composite as described above in conjunction with an acoustic device having a transducer and an acoustic cavity proximate to the transducer, wherein the acoustically reactive composite layer spans the acoustic cavity. In some embodiments, the acoustically reactive composite layer also spans an acoustic channel in a housing of the acoustic device.

BRIEF DESCRIPTION OF THE DRAWINGS

FIG. 1 shows a side cross-sectional view of an acoustic protective cover configuration, according to some embodiments.

FIG. 3 shows an example of a Frequency Response Test apparatus in a side cross-sectional view, according to some embodiments.

FIG. 5 shows an example of an acoustic response, according to some embodiments.

Figure 2A:
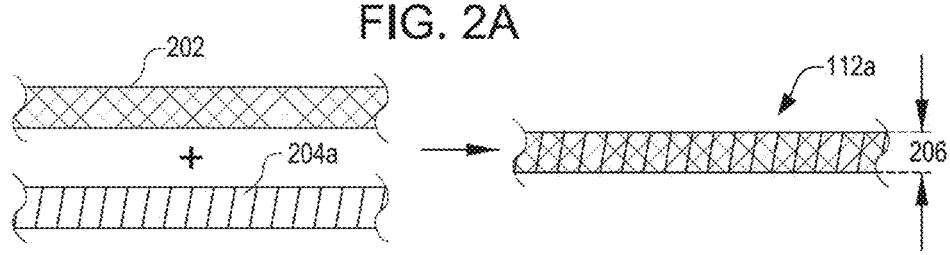
FIG. 2A shows an example of an ePTFE composite having an ePTFE matrix fully impregnated with an elastomer, according to some embodiments.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives thereof.

DETAILED DESCRIPTION

Various embodiments described herein address a protective acoustic cover that enables minimal sound attenuation and optionally SWB HD voice call while providing adequate environmental protection, including protection from water infiltration, as well as methods of making such protective acoustic covers.

A PTFE composite according to some embodiments comprises a micro-porous expanded PTFE (ePTFE) membrane matrix with an elastomer fully impregnated within the membrane matrix. The composite has a first surface and a second surface, and a thin layer of elastomer is optionally present on the first or second surface or on both surfaces of the composite.

FIG. 1 shows an example of an assembly 100 of an acoustic protective cover assembly 110 mounted with an acoustic device 102, in accordance with embodiments. As shown, the acoustic protective cover assembly 110 includes a composite 112 (an ePTFE composite as described in association with the various examples) and an adhesive layer 114 (e.g., a ring of adhesive) for securing the acoustic protective cover assembly to, for example, an acoustic device 102 such as a speaker or receiver. The acoustic device 102 can include a device body 106 to which the adhesive layer 114 is attached, and a transducer 104. The composite 112 is acoustically reactive, i.e., is capable of vibrating to create sound.

Suitable ePTFE membranes for forming the composite 112 and associated manufacturing techniques are described in U.S. Pat. Nos. 5,476,589 or 7,306,729, for example, the entire contents of both of which are incorporated herein by reference. The highly fibrillated nature of the ePTFE membranes of these patents is advantageous. That is, the membranes have a microstructure of substantially only fibrils fused at crossover points. Unlike conventional node-and-fibril ePTFE microstructures, the highly fibrillated microstructures of the ePTFE membranes herein described form a porous microstructure composed of substantially only fibrils, i.e. fibrils with no nodes present or the microstructure is substantially free of nodes.

In some embodiments, the ePTFE membrane has a thickness less than 25 micron, preferably less than 15 micron, more preferably less than 5 micron.

In some embodiments, the ePTFE membrane has a mass less than 5 g/m$^2$, preferably less than 3 g/m$^2$, more preferably less than 2.5 g/m$^2$, most preferably less than 1 g/m$^2$.

In some embodiments, the ePTFE membrane has a product of Matrix Tensile Strengths in two orthogonal directions greater than about $1.3 \times 10^5$ MPa$^2$. The composite can be assembled by applying an elastomer/solvent coating composition to substrate that includes an ePTFE membrane supported by a solid polymeric release film. The resultant composite has elastomer fully impregnated within the fibrillated ePTFE membrane matrix wherein the elastomer substantially fills the pores of the ePTFE membrane matrix. Although some unfilled voids may be present in a fully impregnated composite, in general, a fully impregnated composite membrane will be nonporous to air.

Figure 2B:
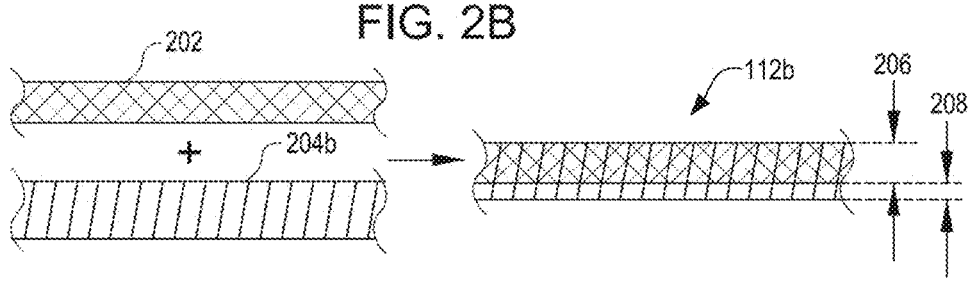
FIG. 2B shows an example of an ePTFE composite having an ePTFE matrix fully impregnated with an elastomer and having an elastomeric coating that substantially coats the composite on one side, according to some embodiments.
Figure 2C:
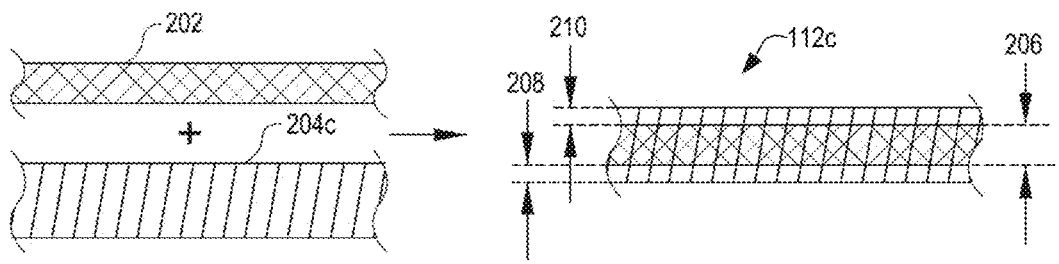
FIG. 2C shows an example of an ePTFE composite having an ePTFE fully impregnated with an elastomer and having an elastomeric coating that coats both sides of the composite, according to some embodiments.

As shown in FIGS. 2A-2C, a layer of elastomer is optionally present on one or on both surfaces of the composite, according to various embodiments. For example, as shown in FIG. 2A, a highly fibrillated ePTFE matrix 202 may be combined with a first quantity of elastomer 204a to form a fully impregnated ePTFE/elastomer composite 112a, wherein the elastomer is substantially contained in the composite layer 206. When impregnated there is no significant air flow through the composite layer 206. For example, a composite layer 206 can have a Gurley number of approximately 10,000 seconds. In another example, as shown in FIG. 2B, the highly fibrillated ePTFE matrix 202 may be combined with a second quantity of elastomer 204b to form a second fully impregnated ePTFE/elastomer composite 112 with a composite layer 206 and a single elastomeric coat 208, which may also be referred to as a butter coat. The thickness of the elastomer layer is less than 5 micron, more preferably, less than 3 micron, most preferably, less than 2 micron. The addition of the single elastomeric coat 208 can affect performance characteristics of the composite 112b by, e.g., increasing the water entry pressure WEP. In a third example, as shown in FIG. 2C, the highly fibrillated ePTFE matrix 202 may be combined with a third quantity of elastomer 204c to form a third fully impregnated ePTFE/elastomer composite 112c. The third exemplary fully impregnated ePTFE/elastomer composite 112c has a first elastomeric coat 208 and a second elastomeric coat 210 sandwiching the composite layer 206. Embodiments of the third composite 112c having both first and second elastomeric coats 208, 210 can have further increased WEP over embodiments substantially lacking an elastomeric coat (e.g. 112a, FIG. 2A) or having one elastomeric coat (e.g. 112b, FIG. 2B). Specific embodiments may be selected according to application requirements, e.g. composite layers similar to the first composite 112a may be selected where acoustic transference is the most important design criterion; and composite layers similar to the second or third composites 112b, 112c may be selected where WEP is a more important criterion.

The coating compositions are applied to the ePTFE membrane matrix using any conventional technique known in the art. Non-limiting examples of suitable techniques include spraying, curtain coating, dipping, rod coating, blade coating, transfer roll coating, wire-wound bar coating, reverse roll coating, size press, printing, brushing, drawing, slot-die coating, solution coating or imbibing and extrusion.

In a further non-limiting embodiment, once the coating composition has been applied to the substrate, the solvent is optionally removed, e.g. by drying or evaporation. Solvent removal is accomplished by a wide variety of conventional drying techniques known in the art. In a non-limiting embodiment, the coating may be dried by exposing the coated substrate to forced air at a temperature in the range of from ambient to 300 degrees F. In some cases, the coating may be dried by exposing the coated substrate to forced gas, e.g. an inert gas.

The elastomer is generally chosen from a set of materials having a low modulus and thereby having a negligible direct contribution to the stiffness of the final composite. The elastomer confers dimensional stability and strength to the composite.

Elastomers are styrene-based thermoplastic elastomers such as styrene-butadiene-styrene block copolymers, styrene-isoprene-styrene block copolymers, or olefin-based, or vinyl chloride-based, or urethane-based, or imide based, or amide-based polymers. Silicone elastomers, preferably thermoplastic silicones or fluoro-silicones are also be used in some embodiments, as well as a tetrafluoroethylene/perfluoromethyl vinyl ether copolymer, a material described for example in U.S. Pat. No. 7,462,675.

The elastomer is impregnated into the fibrillated PTFE matrix of the ePTFE membrane such that the weight ratio of elastomer in the resultant composite is between 15% and 90%. Preferably, the weight ratio is greater than 0.2 (20%), and most preferably, the weight ratio is greater than 0.4 (40%). The weight ratio is defined as the weight of elastomer in the composite divided by the total weight of the composite.

Test Methods

Acoustic Response

FIG. 3 is a schematic of an example of an Acoustic Response Measurement test setup 300. The following method was used to test acoustic cover samples. A sample 312 was placed over a circular aperture 348 (2 mm diameter) on a sample holder plate 344 by means of an adhesive 314. The sample 312 was placed inside a B&K type 4232 anechoic test box at a distance of about 6.5 cm from an internal driver or speaker (not shown). The speaker was excited to produce an external stimulus at the 1 Pa of sound pressure (94 dB SPL) over the frequency range from 100 Hz to 20 kHz. The acoustic response was measured with a Knowles SPU0410LR5H MEMS measurement microphone 46 under the following conditions: (a.) with the aperture 348 uncovered (b.) with the aperture 348 covered with an acoustic protective cover sample 312. The transducer 352 of the measurement microphone 46 is in fluid communication with the circular aperture 348. The difference in the response was reported in dB (at a specified frequency) as the acoustic loss due to the protective cover. Vibrating membrane covers produce a resonant peak corresponding to the natural frequency of the membrane. The resonant peak was defined as the point in the frequency spectrum producing the highest Sound Pressure Level (SPL) at the microphone. In some cases, the sound pressure level at the resonant peak may exceed the sound pressure level achieved with the aperture uncovered.

Water Entry Pressure (WEP)

WEP relates to water intrusion through a material. WEP values were determined according to the following procedure. The test sample (1.5 mm diameter circular membrane sample) was held on a sample holder by means of a clamp. The sample was then pressurized with water. The pressure at which water breaks through via the membrane occurs was recorded as the Water Entry Pressure.

EXAMPLES

Example 1

A highly fibrillated expanded PTFE (ePTFE) membrane was made according to the general teachings described in U.S. Pat. No. 7,306,729. The membrane had a Mass per Area of about 2.5 grams/m$^2$ and a thickness of about 3.2 microns.

A solution of Kraton® [Grade D1124] in 42.5/57.5 Toluene/Heptane solution [10% solids Kraton® in solution] was impregnated into a roll of the above ePTFE membrane using a slot-die coating system, while being supported by a polyethylene release film. The solvent was dried at a temperature of 190 degrees F. in a convection oven. The mass per area of the resultant composite was 5.2 grams/m$^2$. The weight ratio of Kraton® in the resultant composite was 0.52. (52%)

Figure 4A:
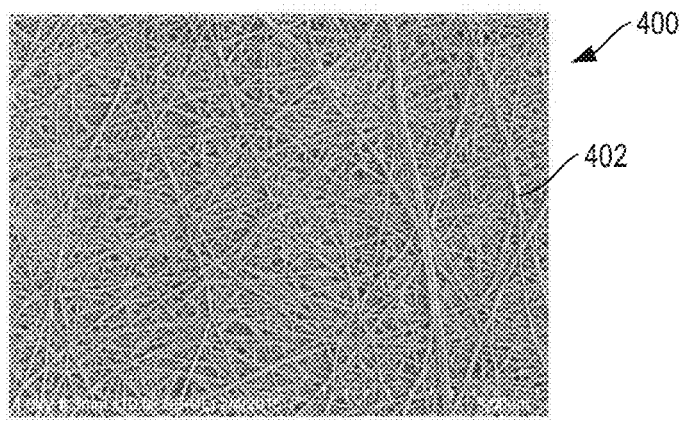
FIG. 4A shows a Scanning Electron Micrograph (SEM) of a first surface of a composite comprising the elastomer impregnated ePTFE matrix.
Figure 4B:
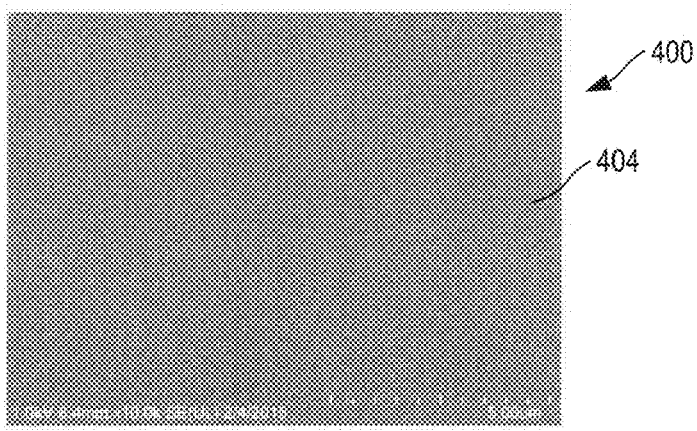
FIG. 4B shows a SEM of a second surface of the composite of FIG. 4A.
Figure 4C:
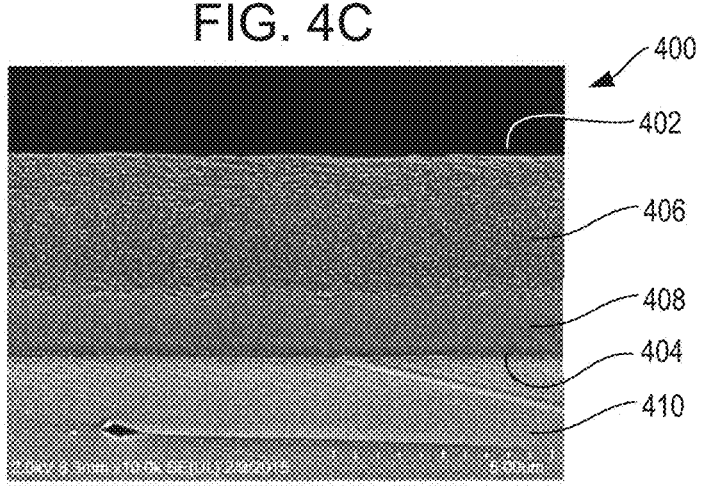
FIG. 4C shows a SEM of a cross section of the composite of FIGS. 4A and 4B.

FIG. 4A and FIG. 4B respectively show an SEM of a first surface 402 and an SEM of a second surface 404 of a composite 400, according to embodiments. FIG. 4C shows a cross-section of the composite 400. As shown, the ePTFE membrane 406 was fully impregnated with elastomer throughout its cross-section. The thickness of the composite 400 as shown in the SEM was about 4.6 microns. An elastomeric coat 408 of about 1.35 microns in thickness was present as a butter coat on the second surface 404. FIG. 4C further shows a sacrificial layer 410 which would be removed from the composite 400 before use.

A first example of a protective acoustic cover (rectangle of 1.2 mm by 1.6 mm) as generally shown in FIG. 1 was constructed using composite described above in EXAMPLE 1 with reference to FIG. 4. The protective acoustic cover was provided with a frame of adhesive to facilitate mounting of the protective acoustic cover to the speaker/receiver of a microphone. The acoustic response of the protective cover was tested according to the test methods described herein.

FIG. 5 shows the acoustic response at the MEMS measurement microphone 46 (see FIG. 3) of acoustic response tests using different exemplary protective acoustic covers including: a first exemplary cover (see EXAMPLE 1, above), a second exemplary cover (see EXAMPLE 2, below), two comparative examples, and a control test wherein no protective acoustic cover was used.

For example, FIG. 5 shows the acoustic response of a protective cover according to the first exemplary protective acoustic cover of EXAMPLE 1. The acoustic loss of this protective acoustic cover of this Example was 6.43 dB at a frequency of 1 kHz. The resonance peak appeared at a frequency of 20 kHz, which is well above 16 KHz, indicative of the ability of the cover to enable Super Wideband HD voice call.

WEP of the first exemplary protective cover was measured to be 73 psi.

Example 2

An expanded PTFE (ePTFE) was made according to the general teachings described in U.S. Pat. No. 7,306,729. The membrane had a Mass per Area of about 0.52 grams/m$^2$, Matrix Tensile Strength of about 655 MPa in the longitudinal Direction and about 310 MPa in the transverse direction.

A solution of Kraton® [Grade D1124] in 42.5/57.5 Toluene/Heptane solution (4.5% solids Kraton® in solution) was impregnated into a roll of the above ePTFE membrane using a slot-die coating system, while being supported by a polyethylene release film. The solvent was dried at a temperature of 190 degrees F. in a convection oven. The mass per area of the resultant composite was 1.01 grams/m$^2$. The weight ratio of Kraton® in the resultant composite was 0.49 (49%).

A protective acoustic cover (rectangle of 1.2 mm by 1.6 mm) as generally shown in FIG. 1 was constructed using the above composite. The protective acoustic cover was provided with a frame of adhesive to facilitate mounting of the protective acoustic cover to the speaker/receiver of a microphone. The acoustic response of the protective cover was tested according to the test methods described herein.

The acoustic response of a protective cover according to the second exemplary protective acoustic cover of EXAMPLE 2 is also shown in FIG. 5. The acoustic loss of this protective acoustic cover of this Example was 1.54 dB at a frequency of 1 kHz. The resonance peak appeared at a frequency of 19.5 kHz, well above 16 KHz, indicative of the ability of the cover to enable Super Wideband HD voice call.

WEP of the second exemplary protective cover was measured to be 20 psi.

Comparative Examples

Table I shows the acoustic loss, resonance peak and WEP of two comparative examples, protective acoustic covers (rectangle of 1.2 mm by 1.6 mm) available as Part Numbers: GAW 325 & GAW 340 from W.L. Gore & Associates, Inc., as compared to the Examples above.

As shown in Table I, the protective acoustic covers of the present disclosure surprisingly offer a superior combination of low acoustic loss and high water entry pressure compared to known materials, while maintaining resonance peaks at or above 16 KHz.

TABLE I

| Examples | Acoustic Loss @ 1 KHz (dB) | Resonance Peak (kHz) | WEP (psi) |
|---|---|---|---|
| Inventive Example 1 | 6.43 | 20 | 73 |
| Inventive Example 2 | 1.54 | 19.5 | 20 |
| Comparative Example 1: GAW 325 | 6.52 | 14 | 25 |
| Comparative Example 2: GAW 340 | 0.96 | 13.2 | 3 |

Various modifications and additions can be made to the exemplary embodiments discussed without departing from the scope of invention. For example, while various embodiments and examples are provided that include ePTFE membranes, it should be understood that a variety of other membrane materials are optionally formed into a composite with a support layer using the techniques and materials described herein. While the embodiments described above refer to particular features, the scope of invention also includes embodiments having different combinations of features and embodiments that do not include all of the described features.

Figure 6:
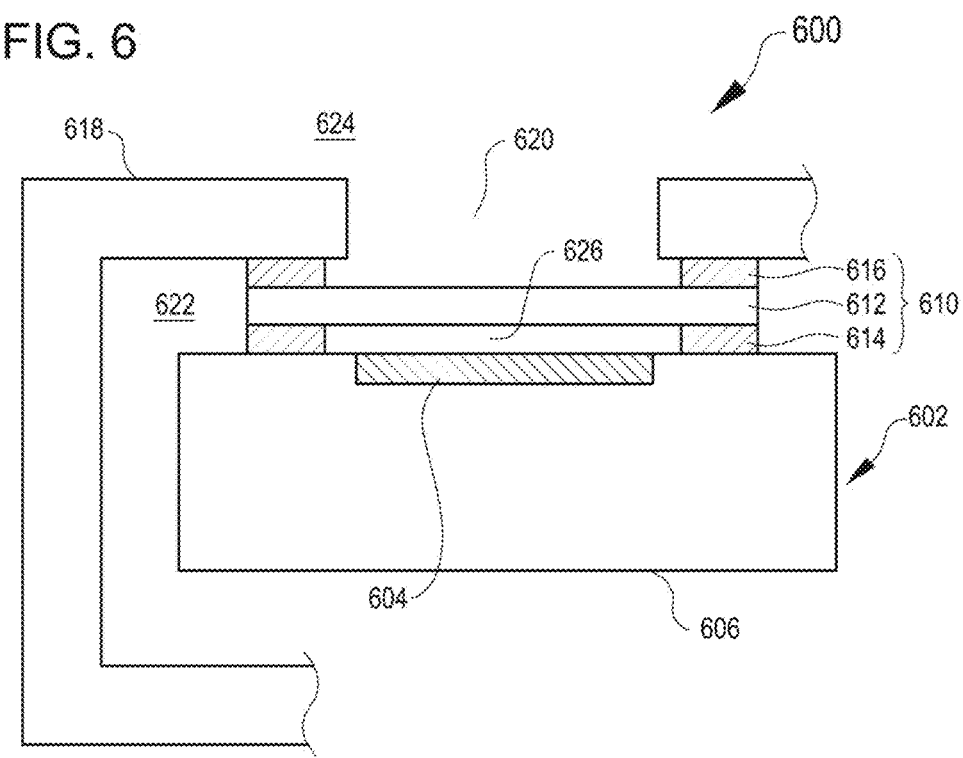
FIG. 6 shows an example of an acoustic device in a side schematic view showing a protective acoustic cover in conjunction with an acoustic device and a housing.

FIG. 6 shows a side schematic view of an acoustic device assembly 600 employing an acoustic protective cover 612 in conjunction with an acoustic device 602, in accordance with some embodiments. The acoustic device 602 may be a bell, speaker, microphone, buzzer, loudspeaker, or any similar acoustic device. The acoustic device 602 includes a device body 606 and a transducer 604 attached with or embedded in the device body and aligned with an acoustic cavity 626. The acoustic cavity 626 is defined by the acoustic device 602 on one side, by the acoustic protective cover 612 on the other side, and by a first adhesive layer 614 around the periphery. The acoustic cavity 626 may also be aligned with a port 620 in a housing 618 that contains the acoustic device 602. The acoustic protective cover 612 can in some cases be connected with both the acoustic device 602 and with the housing 618, e.g. by way of a second adhesive layer 616 between the acoustic protective cover and the housing. The first and second adhesive layers 614, 616 and the acoustic protective cover 612 form a layered assembly 610, which may can be water resistant and/or waterproof, able to prevent water entry from an exterior space 624 into an interior space 622 of the housing 618 and/or into the acoustic cavity 626. In embodiments, the acoustic protective cover 612 can be any suitable vibroacoustic protective cover, in accordance with the vibroacoustic protective covers herein disclosed.

In the following, further examples are described to facilitate the understanding of the disclosure:

E1: An acoustically reactive composite, comprising an expanded polytetrafluoroethylene (ePTFE) membrane comprising a highly fibrillated microstructure; and an elastomer fully impregnated within the ePTFE membrane to form the composite, wherein; the composite is fully impregnated with an elastomer; the composite has an acoustic loss of less than 7 dB at 1 kHz; and the composite has a water entry pressure (WEP) of at least 20 PSI.

E2. The acoustically reactive composite of any of the previous or subsequent examples, wherein the ePTFE membrane comprises a microstructure of substantially only fibrils fused at crossover points E3. The acoustically reactive composite of any of the previous or subsequent examples, wherein the composite has a water entry pressure of at least 70 PSI.

E4. The acoustically reactive composite of any of the previous or subsequent examples, wherein the composite has an acoustic loss of less than 2 dB at 1 kHz.

E5. The acoustically reactive composite of any of the previous or subsequent examples, wherein the composite has a resonance peak greater than about 15 kHz.

E6. The acoustically reactive composite of any of the previous or subsequent examples, wherein the composite has a resonance peak of at least 16 kHz.

E7. The acoustically reactive composite of any of the previous or subsequent examples, wherein the composite has a resonance peak of at least 19.5 kHz.

E8. The acoustically reactive composite of any of the previous or subsequent examples, wherein the ePTFE membrane has a mass per area of between about 0.5 grams/m2 and about 6.0 g/m2.

E9. The acoustically reactive composite of any of the previous or subsequent examples, wherein the composite is nonporous.

E10. The acoustically reactive composite of any of the previous or subsequent examples, wherein the elastomer comprises at least 20% of the composite by weight.

E11. The acoustically reactive composite of any of the previous or subsequent examples, wherein the elastomer comprises at least 30% of the composite by weight.

E12. The acoustically reactive composite of any of the previous or subsequent examples, wherein the elastomer comprises at least 40% of the composite by weight.

E13. The acoustically reactive composite of any of the previous or subsequent examples, wherein the elastomer comprises about 20% to 90% of the composite by weight.

E14. The acoustically reactive composite of any of the previous or subsequent examples, wherein the elastomer comprises about 40% to 60% of the composite by weight.

E15. The acoustically reactive composite of any of the previous or subsequent examples, wherein the ePTFE membrane is substantially free of nodes.

E16. The acoustically reactive composite of any of the previous or subsequent examples, wherein the ePTFE membrane has a thickness of less than about 5 microns.

E17. The acoustically reactive composite of any of the previous or subsequent examples, wherein the ePTFE membrane has a Matrix Tensile Strength of about 655 MPa in a longitudinal direction and about 310 MPa in a transverse direction.

E18. The acoustically reactive composite of any of the previous or subsequent examples, wherein the composite has a first side and a second side and further comprises a layer of elastomer on at least one of said first and second side.

E19. The acoustically reactive composite of any of the previous or subsequent examples, wherein the layer of elastomer is about 2 microns thick.

E20. The acoustically reactive composite of any of the previous or subsequent examples, wherein the composite has a first side and a second side and further comprises a layer of elastomer coating on one of said first and second side.

E21. The acoustically reactive composite of any of the previous or subsequent examples, wherein the ePTFE membrane is less than about 25 microns thick.

E22. A layered assembly for protecting an acoustic device, the layered assembly comprising an expanded polytetrafluoroethylene (ePTFE) membrane comprising a highly fibrillated microstructure, the ePTFE membrane having a first side and a second side; and an adhesive layer connected with the ePTFE membrane on the first side of the acoustic membrane and defining an acoustic cavity.

E23. The layered assembly of any of the previous or subsequent examples, wherein the adhesive layer is a first adhesive layer, and further comprising a second adhesive layer on the second side of the acoustic membrane, the second adhesive layer defining an acoustic channel aligned with the acoustic cavity, wherein the first adhesive layer is configured to connect the layered assembly with the acoustic device, and the second adhesive layer is configured to connect the layered assembly with a housing containing the acoustic device.

E24. The layered assembly of any of the previous or subsequent examples, wherein the composite layer has an acoustic resonance peak greater than about 16 kHz.

E25. The layered assembly of any of the previous or subsequent examples, wherein the composite layer has a water entry pressure of at least 70 PSI.

E26. The layered assembly of any of the previous or subsequent examples, wherein the composite layer has an acoustic loss of less than 2 dB at 1 kHz.

E27. The layered assembly of any of the previous or subsequent examples, wherein the composite layer further comprises an elastomer coating on at least one of said first and second side.

E28. An acoustic device, comprising: a transducer; an acoustic cavity proximate to the transducer; and an acoustically reactive composite layer spanning the acoustic cavity between the acoustic transducer and an exterior environment, wherein the acoustically reactive composite layer comprises an expanded polytetrafluoroethylene (ePTFE) membrane comprising a highly fibrillated microstructure; and an elastomer fully impregnated within the ePTFE membrane to form the composite, wherein the composite layer has an acoustic loss of less than 7 dB at 1 kHz; and the composite layer has a water entry pressure (WEP) of at least 20 PSI.

E29. The acoustic device of any of the previous or subsequent examples, wherein the acoustic device is a microphone.

E30. The acoustic device of any of the previous or subsequent examples, wherein the acoustic device is a speaker.

E31. The acoustic device of any of the previous or subsequent examples, wherein the composite layer has an acoustic resonance peak greater than about 16 kHz.

E32. The acoustic device of any of the previous or subsequent examples, wherein the composite layer has a water entry pressure of at least 70 PSI.

E33. The acoustic device of any of the previous or subsequent examples, wherein the composite layer has an acoustic loss of less than 2 dB at 1 kHz.

E34. The acoustic device of any of the previous or subsequent examples, wherein the composite layer further comprises an elastomer coating on at least one of said first and second side E35. The acoustic device of any of the previous or subsequent examples, further comprising an adhesive layer connecting the composite layer with the acoustic device.

E36. The acoustic device of any of the previous or subsequent examples, wherein the adhesive layer connecting the composite layer with the acoustic device is a first adhesive layer positioned on a first side of the composite layer, and further comprising: a housing containing the acoustic device, the housing having an acoustic channel aligned with the acoustic cavity; and a second adhesive layer connecting the composite layer with the housing.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An acoustically reactive composite, comprising:
   an expanded polytetrafluoroethylene (ePTFE) membrane comprising a highly fibrillated porous microstructure; and
   an elastomer fully impregnated within the ePTFE membrane and substantially filling the porous microstructure to form the composite, wherein;
   the composite has an acoustic loss of less than 7 dB at 1 kHz; and
   the composite has a water entry pressure (WEP) of at least 20 PSI.

2. The acoustically reactive composite of claim 1, wherein:
   the ePTFE membrane comprises a microstructure of substantially only fibrils fused at crossover points.

3. The acoustically reactive composite of claim 1, wherein:
   the composite has a water entry pressure of at least 70 PSI.

4. The acoustically reactive composite of claim 1, wherein:
   the composite has an acoustic loss of less than 2 dB at 1 kHz.

5. The acoustically reactive composite of claim 1, wherein:
   the composite has a resonance peak greater than about 16 kHz.

6. The acoustically reactive composite of claim 1, wherein:
   the ePTFE membrane has a mass per area of between about 0.5 grams/m$^2$ and about 6.0 g/m$^2$.

7. The acoustically reactive composite of claim 1, wherein:
   the composite is nonporous.

8. The acoustically reactive composite of claim 1, wherein:
   the elastomer comprises at least 20% of the composite by weight.

9. The acoustically reactive composite of claim 1, wherein the ePTFE membrane is substantially free of nodes.

10. The acoustically reactive composite of claim 1, wherein the ePTFE membrane has a thickness of less than about 5 microns.

11. The acoustically reactive composite of claim 1, wherein the ePTFE membrane has a Matrix Tensile Strength of about 655 MPa in a longitudinal direction and about 310 MPa in a transverse direction.

12. The acoustically reactive composite of claim 1, wherein the composite has a first side and a second side and further comprises a layer of elastomer on at least one of said first and second side.

13. The acoustically reactive composite of claim 12, wherein the layer of elastomer is formed of the elastomer fully impregnated within the ePTFE membrane.

14. A layered assembly for protecting an acoustic device, the layered assembly comprising:
- an expanded polytetrafluoroethylene (ePTFE) membrane comprising a highly fibrillated porous microstructure, the ePTFE membrane having a first side and a second side;
- an elastomer fully impregnated within the ePTFE membrane and substantially filling the porous microstructure to form an acoustically reactive composite and
- an adhesive layer connected with the acoustically reactive composite on the first side of the acoustic membrane and defining an acoustic cavity.

15. The layered assembly of claim 14, wherein the adhesive layer is a first adhesive layer, and further comprising a second adhesive layer on the second side of the acoustic membrane, the second adhesive layer defining an acoustic channel aligned with the acoustic cavity, wherein the first adhesive layer is configured to connect the layered assembly with the acoustic device, and the second adhesive layer is configured to connect the layered assembly with a housing containing the acoustic device.

16. An acoustic device, comprising:
- an acoustic device comprising a transducer;
- an acoustic cavity proximate to the transducer; and
- an acoustically reactive composite layer spanning the acoustic cavity between the transducer and an exterior environment, wherein:
    - the acoustically reactive composite layer comprises an expanded polytetrafluoroethylene (ePTFE) membrane comprising a highly fibrillated porous microstructure; and
    - an elastomer fully impregnated within the ePTFE membrane and substantially filling the porous microstructure to form the composite, wherein;
        - the composite layer has an acoustic loss of less than 7 dB at 1 kHz; and
        - the composite layer has a water entry pressure (WEP) of at least 20 PSI.

17. The acoustic device of claim 16, wherein the composite layer has an acoustic resonance peak greater than about 16 kHz.

18. The acoustic device of claim 16, wherein the composite layer has an acoustic loss of less than 2 dB at 1 kHz.

19. The acoustic device of claim 16, further comprising an adhesive layer connecting the composite layer with the acoustic device.

20. The acoustic device of claim 19, wherein the adhesive layer connecting the composite layer with the acoustic device is a first adhesive layer positioned on a first side of the composite layer, and further comprising:
- a housing containing the acoustic device, the housing having an acoustic channel aligned with the acoustic cavity; and
- a second adhesive layer connecting the composite layer with the housing.

* * * * *